(12) United States Patent
Itagaki et al.

(10) Patent No.: US 6,683,308 B2
(45) Date of Patent: Jan. 27, 2004

(54) METHOD AND APPARATUS FOR MEASURING THICKNESS OF THIN FILM

(75) Inventors: Yosuke Itagaki, Kanagawa (JP); Keizo Yamada, Kanagawa (JP); Takeo Ushiki, Kanagawa (JP)

(73) Assignee: Fab Solutions, Inc., Kanagawa (JP)

( * ) Notice: Subject to any disclaimer, the term of this patent is extended or adjusted under 35 U.S.C. 154(b) by 0 days.

(21) Appl. No.: 10/336,766

(22) Filed: Jan. 6, 2003

(65) Prior Publication Data

US 2003/0132381 A1 Jul. 17, 2003

(30) Foreign Application Priority Data

Jan. 17, 2002 (JP) ........................................ 2002-009304

(51) Int. Cl.[7] ........................... G01B 15/02; H01J 37/28; G01R 27/08
(52) U.S. Cl. ...................... 250/310; 250/306; 250/307; 250/311; 250/396 R; 250/492.3
(58) Field of Search ............................... 250/306, 307, 250/310, 311, 396 R, 492.3

(56) References Cited

U.S. PATENT DOCUMENTS

| | | | |
|---|---|---|---|
| 5,162,240 A | * | 11/1992 | Saitou et al. .................. 427/8 |
| 5,376,215 A | * | 12/1994 | Ohta et al. .............. 156/345.24 |
| 5,427,052 A | * | 6/1995 | Ohta et al. ....................... 438/8 |
| 6,306,001 B1 | * | 10/2001 | Hiroki ............................ 445/6 |
| 2003/0132381 A1 | * | 7/2003 | Itagaki et al. ............... 250/310 |
| 2003/0132765 A1 | * | 7/2003 | Yamada et al. ............. 324/702 |

FOREIGN PATENT DOCUMENTS

| | | |
|---|---|---|
| JP | 63-009807 A | 1/1988 |
| JP | 06-273297 A | 9/1994 |
| JP | 08-005528 A | 1/1996 |
| JP | 2000-180143 A | 6/2000 |

OTHER PUBLICATIONS

Yamada et al., "An In–Line Contact and Via hole Inspection Method Using Electron Beam Compensation Method", IEEE 1999, Doc. No. 0–7803–5413–3/99/, available from http://www..fabsol.com/us/images/library/21.pdf.*

* cited by examiner

Primary Examiner—John R. Lee
Assistant Examiner—Bernard Souw
(74) Attorney, Agent, or Firm—Foley & Lardner

(57) ABSTRACT

A film thickness measuring apparatus applies an electron beam to a thin film as a measurement object formed on a substrate, and measures a value of substrate current that flows in the substrate thereupon. The film thickness measuring apparatus corrects the substrate current value taking into account an influence of a charge distribution generated in the neighborhood of the thin film due to the application of the electron beam or an influence of a configuration of the surface of the substrate in the neighborhood of the thin film. The film thickness measuring apparatus acquires reference data representing a correlation between film thicknesses and substrate current values with respect to standard samples and calculates a thickness of the thin film from the corrected substrate current value taking into account the reference data.

18 Claims, 12 Drawing Sheets

ELECTRON BEAM

ELECTRON BEAM

|  | (x1,y1) | (x2,y1) | (x3,y1) | ... |
|---|---|---|---|---|
| MEASURED DATA | a | b | c | ... |
| HOLE RADIUS | r2 | r3 | r1 | ... |
| CORRECTION DATA | f(r2) | f(r3) | f(r1) | ... |
| CORRECTED MEASURED DATA | a'=a−f(r2) | b'=b−f(r3) | c'=c−f(r1) | ... |

| y= α + β *r*exp( γ *r) | | |
|---|---|---|
| | VALUE | ERROR |
| α | −1.9702 | 0.46952 |
| β | 56.428 | 8.1544 |
| γ | −8.3947 | 1.5815 |
| CHI-SQUARE | 1.4849 | NA |
| R | 0.91202 | NA |

METHOD AND APPARATUS FOR MEASURING THICKNESS OF THIN FILM

BACKGROUND OF THE INVENTION

1. Field of the Invention

The present invention relates to a method and apparatus for measuring a thickness of a thin film, using an electron beam.

2. Description of the Related Art

Hitherto, for example, JP-A-H06-273297 discloses a method wherein, upon forming a sample into a thin film by ion beam irradiation, an electron beam is applied to the sample simultaneously with an ion beam so as to prevent excessive etching thereof by detecting the electron beam transmitted through the sample with a Faraday cup.

Similarly, JP-A-H08-5528 discloses a method wherein, when an ion beam processing apparatus is used for preparing a sample for a transmission electron microscope, the ion beam processing amount is controlled by applying an electron beam to a processing portion to detect a current amount of the electron beam transmitted through the processing portion.

According to the methods described in JP-A-H06-273297 and JP-A-H08-5528, however, inasmuch as the amount of the electron beam transmitted through the sample is measured, it is necessary that the sample subjected to measurement be processed to be thin for allowing the electron beam to pass therethrough. Therefore, it has been difficult to measure a thickness of a thin film formed on a support substrate like in case of a normal semiconductor device.

Further, as described in, for example, JP-A-S63-9807, there has been known a method wherein an electron beam is applied to a thin film to collect secondary electrons emitted from the inside of the thin film and, based on a correlation between an amount of collected secondary electrons and a thickness of a thin film, the thickness of the thin film on a substrate is measured. In this method, however, it has been difficult to precisely collect secondary electrons emitted from a thin film formed at the bottom of a hole with a high aspect ratio.

For solving the foregoing problems of the prior art, the present inventor has succeeded in developing a technique wherein the value of substrate current that flows in a substrate upon applying an electron beam to a thin film formed on the substrate is measured, and the thickness of the thin film is calculated based on reference data, and has filed a patent application (JP-A-2000-180143). In this method, since the substrate current value is measured directly from the substrate, i.e. not measuring the amount of the electron beam transmitted through the sample, it is possible to measure even the thickness of a thin film formed on the substrate.

FIG. 1 is a block diagram showing a film thickness measuring apparatus disclosed in JP-A-2000-180143. This apparatus comprises an electron gun 3 for radiating an electron beam to a thin film 2 on a substrate 1, an electrode 4 disposed in contact with the underside of the substrate 1, and a current measuring section 5 for measuring the value of substrate current collected to the electrode 4. The current measured at the current measuring section 5 is adjusted through a current amplifier 6 and a differential amplifier 7 and converted into a digital signal by an A/D converter 9. The film thickness measuring apparatus further comprises a measured current storing section 10 for storing a measured current value converted into a digital signal, an analytical curve data storing section 11 for storing analytical curve data measured using available standard samples, and an analytical curve data comparing section 12 for comparing the analytical curve data and the measured current value.

According to the film thickness measuring apparatus thus configured, there is an effect that the thickness of a thin film, particularly an extremely thin film, can be accurately measured.

The invention of JP-A-2000-180143 employs the following principle. When an electron beam with low energy ranging approximately from several hundred eV to several keV is applied to a sample, secondary electrons are emitted from the neighborhood of the surface of the sample. In general, the secondary electron emission capability of conductors or semiconductors is small, while that of insulators is large. For example, the secondary electron emission capability of silicon being a semiconductor is approximately 0.9, while that of a silicon oxide film being an insulator is approximately 2.

Accordingly, when an electron beam is applied to a semiconductor device with a silicon oxide thin film formed on the surface of a silicon substrate, more secondary electrons are emitted from the silicon oxide film. In this event, electrons flow out from the silicon substrate into the silicon oxide film for compensating for the secondary electrons emitted from the silicon oxide film. That is, the substrate current that is the sum of a current generated by the applied electron beam and a compensation current in the direction opposite to the direction of the generated current flows in the silicon substrate.

FIGS. 2A and 2B are an exemplary diagram showing this principle. As shown in FIG. 2A, in case a silicon oxide thin film is formed on a silicon substrate, when one electron is applied thereto by means of an electron beam, two electrons are emitted from the silicon oxide film as secondary electrons. This results in that one electron is lost from the silicon oxide film, so that one electron flows out from the silicon substrate into the silicon oxide film for compensating for the lost electron. In this event, a substrate current in the direction opposite to the direction of a current generated by the electron beam flows in the silicon substrate.

On the other hand, as shown in FIG. 2B, in case no silicon oxide film is formed on a silicon substrate, when one electron is applied thereto by means of an electron beam, 0.9 electron is emitted from the silicon substrate as secondary electron. As a result, a substrate current corresponding to an amount obtained by subtracting an emitted electron amount from an applied electron amount flows in the silicon substrate in the direction of a current generated by the electron beam.

As described above, when the silicon oxide film is not formed on the silicon substrate, the secondary electron emission amount is small and thus the current generated by the electron beam is dominant, while, as the thickness of the silicon oxide film increases, the compensation current increases. Therefore, by deriving in advance reference data showing a correlation between film thicknesses and substrate current values with respect to standard samples and comparing a measured substrate current value with the reference data, the thickness of a thin film can be calculated.

However, if the film thickness measuring method described in JP-A-2000-180143 is applied to the measurement of a thickness of a thin film formed at the bottom of a hole with a high aspect ratio, a portion of secondary electrons emitted from the thin film is accumulated on the wall of the hole as shown in FIG. 3. As a result, an electric field is generated in the hole due to the secondary electrons accumulated on the wall thereof. It has been found out that further emission of secondary electrons from the surface of the thin film is suppressed due to an influence of this electric field, so that even if the thicknesses are equal to each other, substrate current values differ from each other between a thin film formed on the flat surface and a thin film formed at the bottom of the hole. Specifically, the amount of the secondary electrons emitted from the thin film formed at the bottom of the hole is reduced and thus the compensation current is resultantly reduced, therefore, there arises a problem wherein assuming that the direction of the current generated by the electron beam is a positive direction, the substrate current value is deviated in the positive direction as compared with the flat surface.

The foregoing problem is peculiar to the case where the method described in JP-A-2000-180143 is employed in measuring the thickness of not only a thin film formed on a flat surface, but also a thin film formed at the bottom of a hole with a high aspect ratio or on a substrate having a concave-convex surface. The present invention aims to improve the technique described in JP-A-2000-180143 for solving the foregoing problem.

SUMMARY OF THE INVENTION

The present invention has been made under these circumstances and has an object to provide a technique for measuring a thickness of a thin film formed on a substrate and, in particular, a technique for precisely measuring a thickness of even a thin film formed at the bottom of a hole with a high aspect ratio or on a substrate having a concave-convex surface.

According to the present invention, there is provided a method of measuring a thickness of a thin film as a measurement object using a value of substrate current that flows in a substrate upon applying an electron beam to the thin film formed on the substrate. The method comprises the steps of acquiring reference data representing a correlation between film thicknesses and substrate current values with respect to standard samples; acquiring a value of substrate current that flows in the substrate upon applying an electron beam to the thin film as the measurement object formed on the substrate; correcting the substrate current value taking into account an influence of a charge distribution generated in the neighborhood of the thin film due to the application of the electron beam; and calculating the thickness of the thin film as the measurement object based on the corrected substrate current value taking into account the reference data.

According to this method, since the substrate current value is corrected taking into account an influence of a charge distribution of secondary electrons, even if the secondary electrons emitted from the thin film upon applying the electron beam to the thin film are accumulated in the neighborhood of the thin film, the substrate current value can be compared with the reference data by removing such an influence. Therefore, for example, the thickness of even a thin film formed at the bottom of a hole with a high aspect ratio can be measured accurately.

The substrate current is the sum of a current generated by the electron beam applied to the substrate and a compensation current representing an amount of electrons that flow out from the substrate into the thin film for compensating for secondary electrons emitted from the thin film by applying the electron beam to the thin film.

The substrate current value may be raw data obtained by measuring a value of substrate current that flows in the substrate upon applying the electron beam to the thin film as the measurement object, or may be data obtained by adjusting the raw data through amplification or the like, or may be data obtained by converting those data into digital signals, meaning that any data will do inasmuch as the data is derived from the measured substrate current value.

The energy (acceleration voltage) of the electron beam used in this method is preferably up to the extent where the electron beam does not penetrate the substrate, i.e. for example, up to approximately 10 keV.

The reference data may represent a correlation between a value of substrate current for reference that should flow in the substrate upon applying an electron beam to a thin film with a given thickness, and this given film thickness.

According to the present invention, there is provided a method of measuring a thickness of a thin film as a measurement object using a value of substrate current that flows in a substrate upon applying an electron beam to the thin film formed on the substrate. The method comprises the steps of acquiring reference data representing a correlation between film thicknesses and substrate current values with respect to standard samples; acquiring a value of substrate current that flows in the substrate upon applying an electron beam to the thin film as the measurement object formed on the substrate; correcting the substrate current value taking into account an influence of a configuration of the surface of the substrate in the neighborhood of the thin film; and calculating the thickness of the thin film as the measurement object based on the corrected substrate current value taking into account the reference data.

According to this method, since the substrate current value is corrected taking into account an accumulated amount of secondary electrons depending on a configuration of the surface of the substrate in the neighborhood of the thin film, even if the secondary electrons emitted from the thin film upon applying the electron beam to the thin film are accumulated in the neighborhood of the thin film, the substrate current value can be compared with the reference data by removing such an influence. Therefore, for example, the thickness of even a thin film formed at the bottom of a hole with a high aspect ratio can be measured accurately.

The influence of the configuration of the surface of the substrate may be an influence caused by a difference in level between a region where the thin film is formed and the neighborhood thereof, or may be an influence caused by unevenness between a region where the thin film is formed and the neighborhood thereof.

The thin film may be provided at the bottom of a concave portion formed on an accumulation film on the substrate, and the correcting step may calculate an influence of a charge distribution depending on a configuration of the concave portion where the thin film is provided.

It may be arranged that the method further comprises a step of acquiring layout data representing the arrangement of the concave portions formed on the surface of the substrate, that the step of acquiring the substrate current value acquires positions on the thin films where the electron beam is applied, correspondingly to the substrate current values, and that the correcting step corrects the substrate current values based on the layout data of the positions where the electron beam is applied.

The substrate in the present invention represents a base material serving as a ground on which a thin film as a film thickness measurement object is formed, and further represents a semiconductor substrate with or without an accumulation film formed thereon, an insulating substrate with or without an accumulation film formed thereon, or the like. For example, it represents a silicon substrate with an insulating film formed thereon.

It may be arranged that the step of acquiring the layout data includes the steps of applying an electron beam to the thin films for acquiring the layout data, before applying the electron beam to the thin films for calculating the thicknesses of the thin films; acquiring a value of substrate current that flows in the substrate thereupon, correspondingly to each applying position of the electron beam; and detecting the arrangement of the concave portions formed on the surface of the substrate based on the substrate current values and the applying positions.

It may be arranged that the step of acquiring the layout data acquires the layout data based on design data.

It may be arranged that each concave portion is a hole, and the correcting step corrects the substrate current values using a correction equation having a radius of the hole as a variable.

It may be arranged that a plurality of concave portions are formed on the surface of the substrate, the step of acquiring the substrate current value acquires substrate current values correspondingly to positions of the concave portions, respectively, the step of acquiring layout data includes a step of detecting configurations of the concave potions correspondingly to the positions of the concave portions, respectively, and the correcting step corrects the substrate current values depending on the configurations of the concave portions, respectively.

According to the present invention, there is provided an apparatus for measuring a thickness of a thin film as a measurement object using a value of substrate current that flows in a substrate upon applying an electron beam to the thin film formed on the substrate. This apparatus comprises a reference data acquiring section for acquiring reference data representing a correlation between film thicknesses and substrate current values with respect to standard samples; a measured data acquiring section for acquiring a value of substrate current that flows in the substrate upon applying an electron beam to the thin film as the measurement object formed on the substrate; a correction processing section for correcting the substrate current value taking into account an influence of a charge distribution generated in the neighborhood of the thin film due to the application of the electron beam; and a calculation processing section for calculating the thickness of the thin film as the measurement object based on the corrected substrate current value taking into account the reference data.

According to this apparatus, since the correction processing section corrects the substrate current value taking into account an influence of a charge distribution of secondary electrons, even if the secondary electrons emitted from the thin film upon applying the electron beam to the thin film are accumulated in the neighborhood of the thin film, the calculation processing section can compare the substrate current value with the reference data by removing such an influence. Therefore, for example, the thickness of even a thin film formed at the bottom of a hole with a high aspect ratio can be measured accurately.

It may be arranged that the thin film is provided at the bottom of a concave portion formed on the surface of the substrate, and the correction processing section calculates the influence of the charge distribution depending on a configuration of the concave portion where the thin film is provided.

According to the present invention, there is provided an apparatus for measuring a thickness of a thin film as a measurement object using a value of substrate current that flows in a substrate upon applying an electron beam to the thin film formed on the substrate. This apparatus comprises a reference data acquiring section for acquiring reference data representing a correlation between film thicknesses and substrate current values with respect to standard samples; a measured data acquiring section for acquiring a value of substrate current that flows in the substrate upon applying an electron beam to the thin film as the measurement object formed on the substrate; a correction processing section for correcting the substrate current value taking into account an influence of a configuration of the surface of the substrate in the neighborhood of the thin film; and a calculation processing section for calculating the thickness of the thin film as the measurement object based on the corrected substrate current value taking into account the reference data.

According to this apparatus, since the correction processing section corrects the substrate current value taking into account an accumulated amount of secondary electrons depending on a configuration of the surface of the substrate in the neighborhood of the thin film, even if the secondary electrons emitted from the thin film upon applying the electron beam to the thin film are accumulated in the neighborhood of the thin film, the calculation processing section can compare the substrate current value with the reference data by removing such an influence. Therefore, for example, the thickness of even a thin film formed at the bottom of a hole with a high aspect ratio can be measured accurately.

It may be arranged that the apparatus further comprises an electron beam applying section for applying the electron beam to the thin film as the measurement object; and a current measuring section for measuring a value of substrate current that flows in the substrate upon applying the electron beam to the thin film, and that the measured data acquiring section acquires the substrate current value from the current measuring section.

It may be arranged that the current measuring section comprises an electrode provided in contact with the substrate, and measures a current flowing in the electrode as the substrate current value.

It may be arranged that the apparatus further comprises a layout data storing section for storing layout data representing the arrangement of the concave portion formed on the surface of the substrate, that the current measuring section acquires a position on the thin film where the electron beam is applied, correspondingly to the substrate current value, and that the correction processing section corrects the substrate current value based on the layout data of the position where the electron beam is applied.

It may be arranged that the concave portion is a hole, and the correction processing section corrects the substrate current value using a correction equation having a radius of the hole as a variable.

It may be arranged that a plurality of concave portions are formed on the surface of the substrate, that the measured data recording section stores substrate current values correspondingly to positions of the concave portions, respectively, that the layout data storing section stores configurations of the concave potions correspondingly to the positions of the concave portions, respectively, and that the correction processing section corrects the substrate current values depending on the configurations of the concave portions, respectively.

According to the present invention, there is provided a program for causing a computer to execute a method of processing of measuring a thickness of a thin film as a measurement object using a value of substrate current that flows in a substrate upon applying an electron beam to the thin film formed on the substrate. This program causes the computer to execute the method comprising the steps of: acquiring reference data representing a correlation between film thicknesses and substrate current values with respect to standard samples; acquiring a value of substrate current that flows in the substrate upon applying an electron beam to the thin film as the measurement object formed on the substrate; correcting the substrate current value taking into account an influence of a charge distribution generated in the neighborhood of the thin film due to the application of the electron beam; and calculating the thickness of the thin film as the measurement object based on the corrected substrate current value taking into account the reference data.

According to the present invention, there is provided a program for causing a computer to execute a method of processing of measuring a thickness of a thin film as a measurement object using a value of substrate current that flows in a substrate upon applying an electron beam to the thin film formed on the substrate. This program controls an information processing apparatus comprising: reference data acquiring means for acquiring reference data representing a correlation between film thicknesses and substrate current values with respect to standard samples; measured data acquiring means for acquiring a value of substrate current that flows in the substrate upon applying an electron beam to the thin film as the measurement object formed on the substrate; correction processing means for correcting the substrate current value; and calculation processing means for calculating the thickness of the thin film as the measurement object based on the corrected substrate current value taking into account the reference data, and causes the reference data acquiring means to execute a process of acquiring the reference data, causes the measured data acquiring means to execute a process of acquiring the substrate current value, causes the correction processing means to execute a process of correcting the substrate current value taking into account an influence of a charge distribution generated in the neighborhood of the thin film due to the application of the electron beam, and causes the calculation processing means to execute a process of reading out the reference data from the reference data storing means and calculating the thickness of the thin film as the measurement object based on the corrected substrate current value taking into account the reference data.

According to the present invention, there is provided a program for causing a computer to execute a method of processing of measuring a thickness of a thin film as a measurement object using a value of substrate current that flows in a substrate upon applying an electron beam to the thin film formed on the substrate. This program causes the computer to execute the method comprising the steps of: acquiring reference data representing a correlation between film thicknesses and substrate current values with respect to standard samples; acquiring a value of substrate current that flows in the substrate upon applying an electron beam to the thin film as the measurement object formed on the substrate; correcting the substrate current value taking into account an influence of a configuration of the surface of the substrate in the neighborhood of the thin film; and calculating the thickness of the thin film as the measurement object based on the corrected substrate current value taking into account the reference data.

According to the present invention, there is provided a program for causing a computer to execute a method of processing of measuring a thickness of a thin film as a measurement object using a value of substrate current that flows in a substrate upon applying an electron beam to the thin film formed on the substrate. This program controls an information processing apparatus comprising: reference data acquiring means for acquiring reference data representing a correlation between film thicknesses and substrate current values with respect to standard samples; measured data acquiring means for acquiring a value of substrate current that flows in the substrate upon applying an electron beam to the thin film as the measurement object formed on the substrate; correction processing means for correcting the substrate current value; and calculation processing means for calculating the thickness of the thin film as the measurement object based on the corrected substrate current value taking into account the reference data, and causes the reference data acquiring means to execute a process of acquiring the reference data, causes the measured data acquiring means to execute a process of acquiring the substrate current value, causes the correction processing means to execute a process of correcting the substrate current value taking into account an influence of a configuration of the surface of the substrate in the neighborhood of the thin film, and causes the calculation processing means to execute a process of reading out the reference data from the reference data storing means and calculating the thickness of the thin film as the measurement object based on the corrected substrate current value taking into account the reference data.

According to the present invention, there is provided a computer-readable recording medium recording a program for causing a computer to execute a method of processing of measuring a thickness of a thin film as a measurement object using a value of substrate current that flows in a substrate upon applying an electron beam to the thin film formed on the substrate. This recording medium records a program that causes the computer to execute the method comprising the steps of: acquiring reference data representing a correlation between film thicknesses and substrate current values with respect to standard samples; acquiring a value of substrate current that flows in the substrate upon applying an electron beam to the thin film as the measurement object formed on the substrate; correcting the substrate current value taking into account an influence of a charge distribution generated in the neighborhood of the thin film due to the application of the electron beam; and calculating the thickness of the thin film as the measurement object based on the corrected substrate current value taking into account the reference data.

According to the present invention, there is provided a computer-readable recording medium recording a program for causing a computer to execute a method of processing of measuring a thickness of a thin film as a measurement object using a value of substrate current that flows in a substrate upon applying an electron beam to the thin film formed on the substrate. This recording medium records a program that causes the computer to execute the method comprising the steps of: acquiring reference data representing a correlation between film thicknesses and substrate current values with respect to standard samples; acquiring a value of substrate current that flows in the substrate upon applying an electron beam to the thin film as the measurement object formed on the substrate; correcting the substrate current value taking into account an influence of a configuration of the surface of the substrate in the neighborhood of the thin film; and calculating the thickness of the thin film as the measurement object based on the corrected substrate current value taking into account the reference data.

The present invention is further applicable to desired combinations of the foregoing constituent elements, and conversion of expressions of the present invention among methods, apparatuses, systems, recording mediums, computer programs and so forth.

DESCRIPTION OF THE PREFERRED EMBODIMENT

Figure 1:
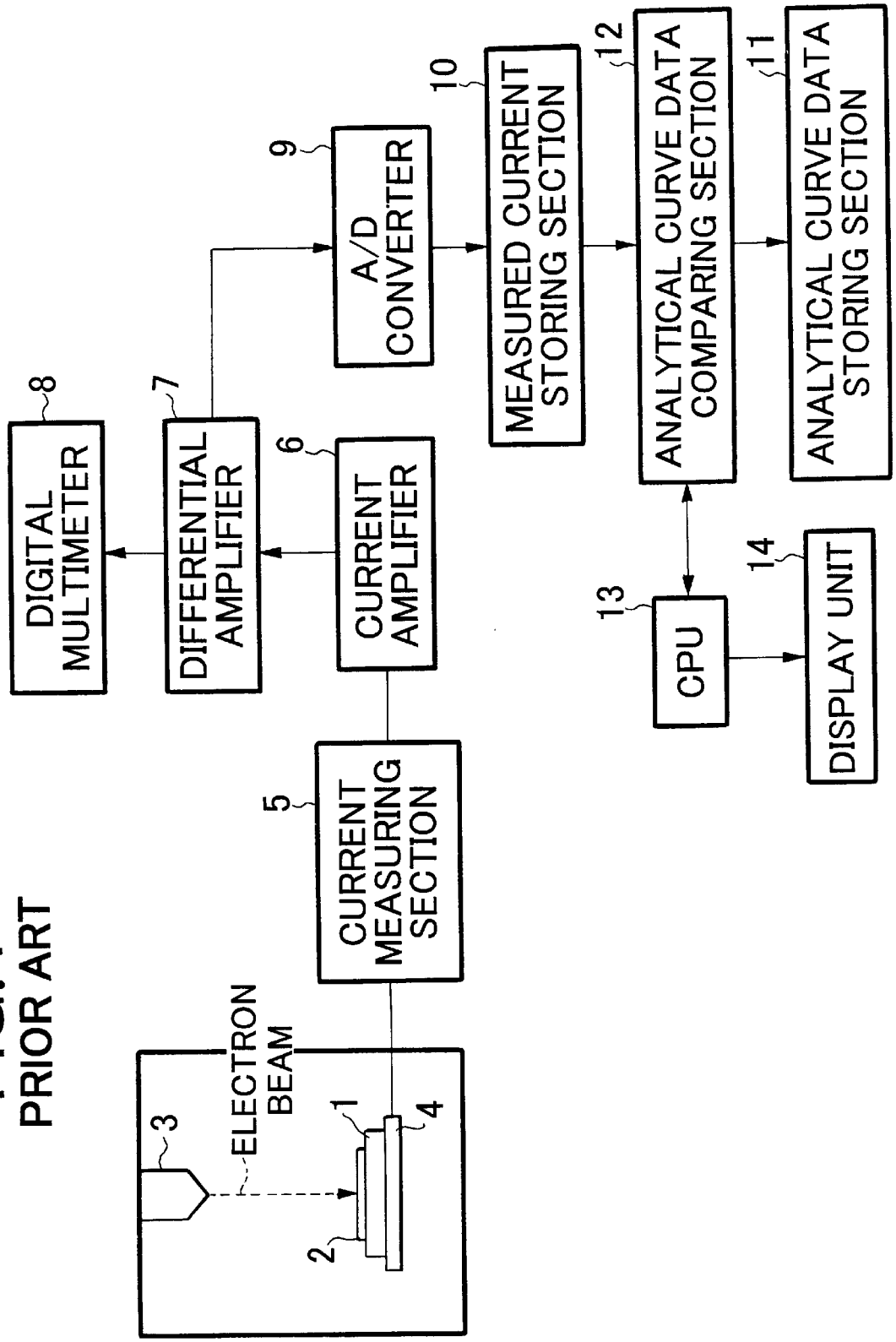
FIG. 1 is a block diagram showing a conventional film thickness measuring apparatus.
Figure 2A:
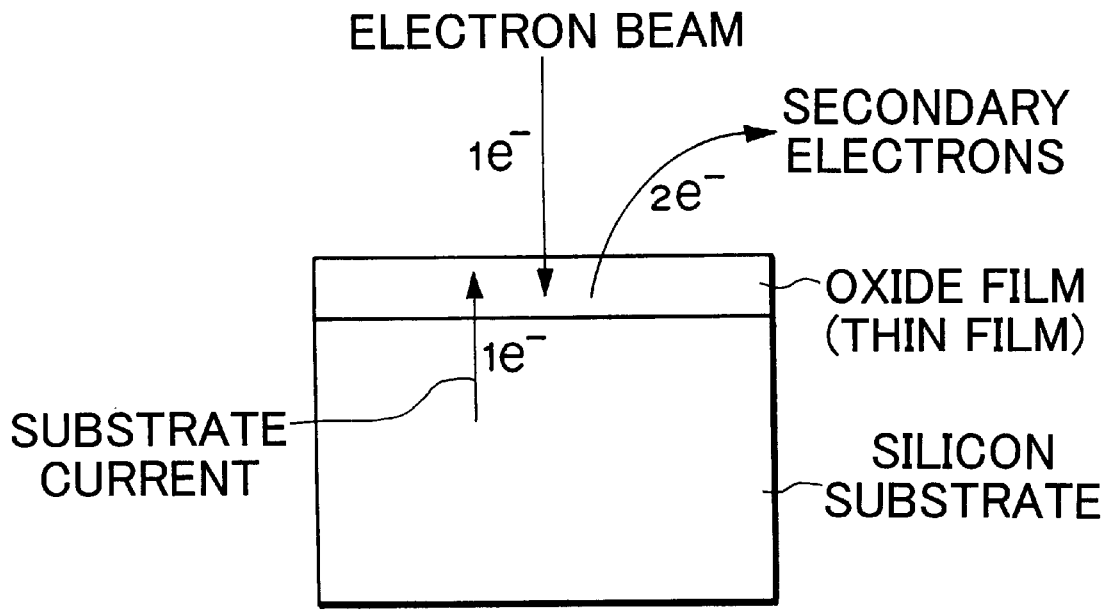
FIGS. 2A and 2B are an exemplary diagram showing the principle that when an electron beam is applied to a thin film on a substrate, a substrate current flows in the substrate.
Figure 2B:
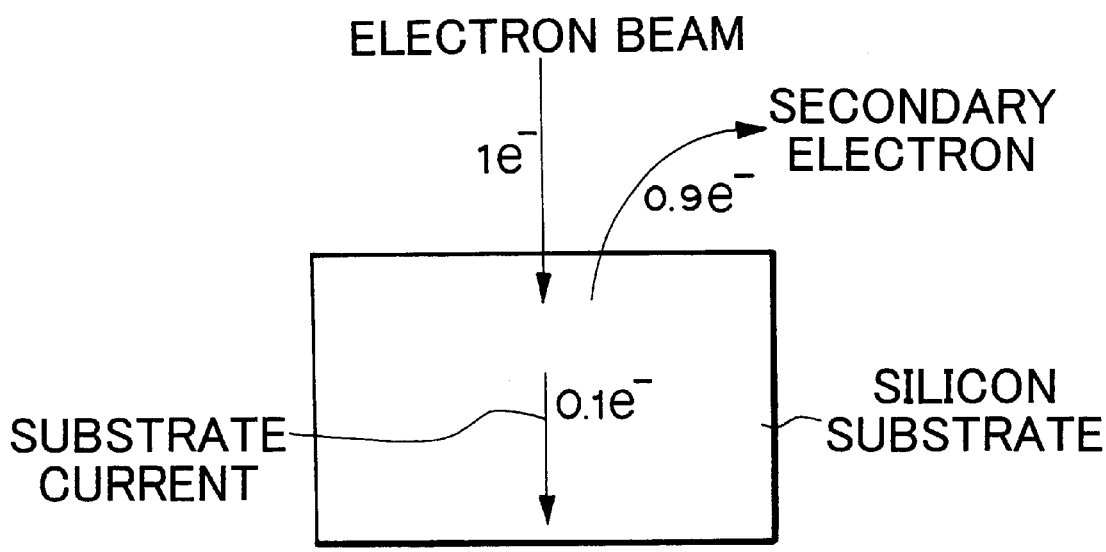
Figure 3:
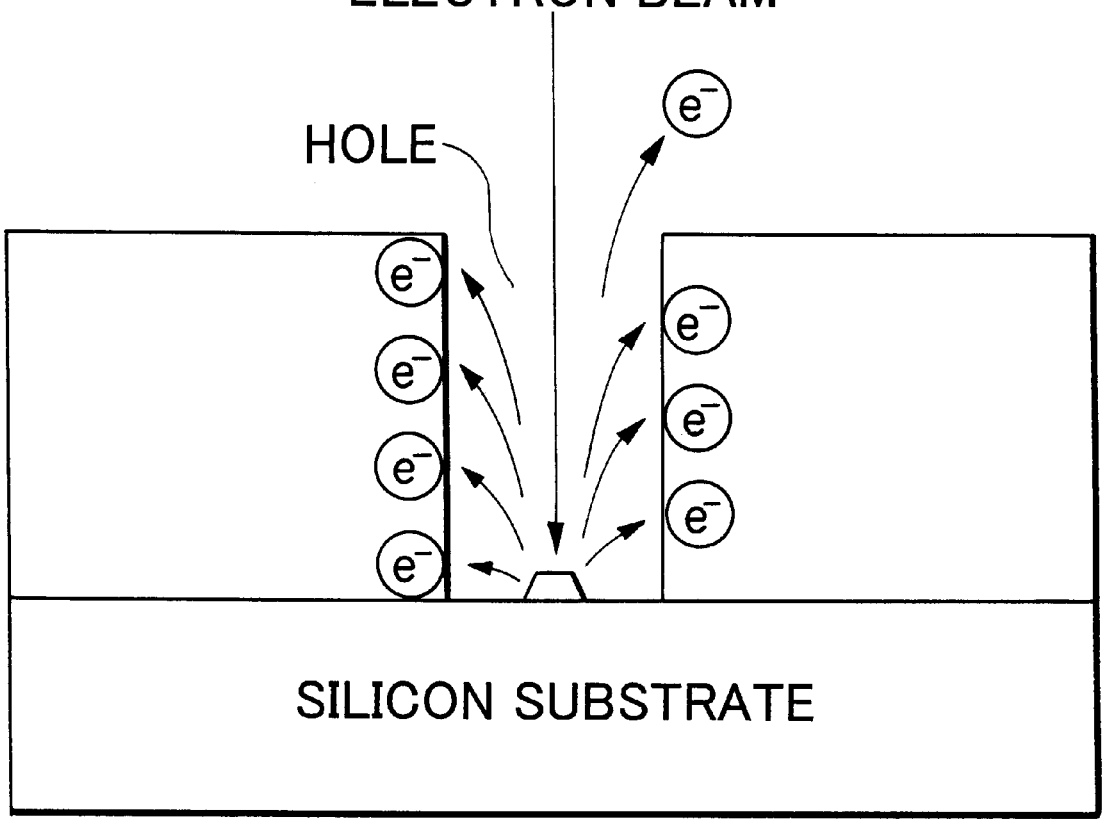
FIG. 3 is a diagram exemplarily showing the state wherein when an electron beam is applied to a thin film formed at the bottom of a hole, secondary electrons are accumulated on the wall of the hole.
Figure 4:
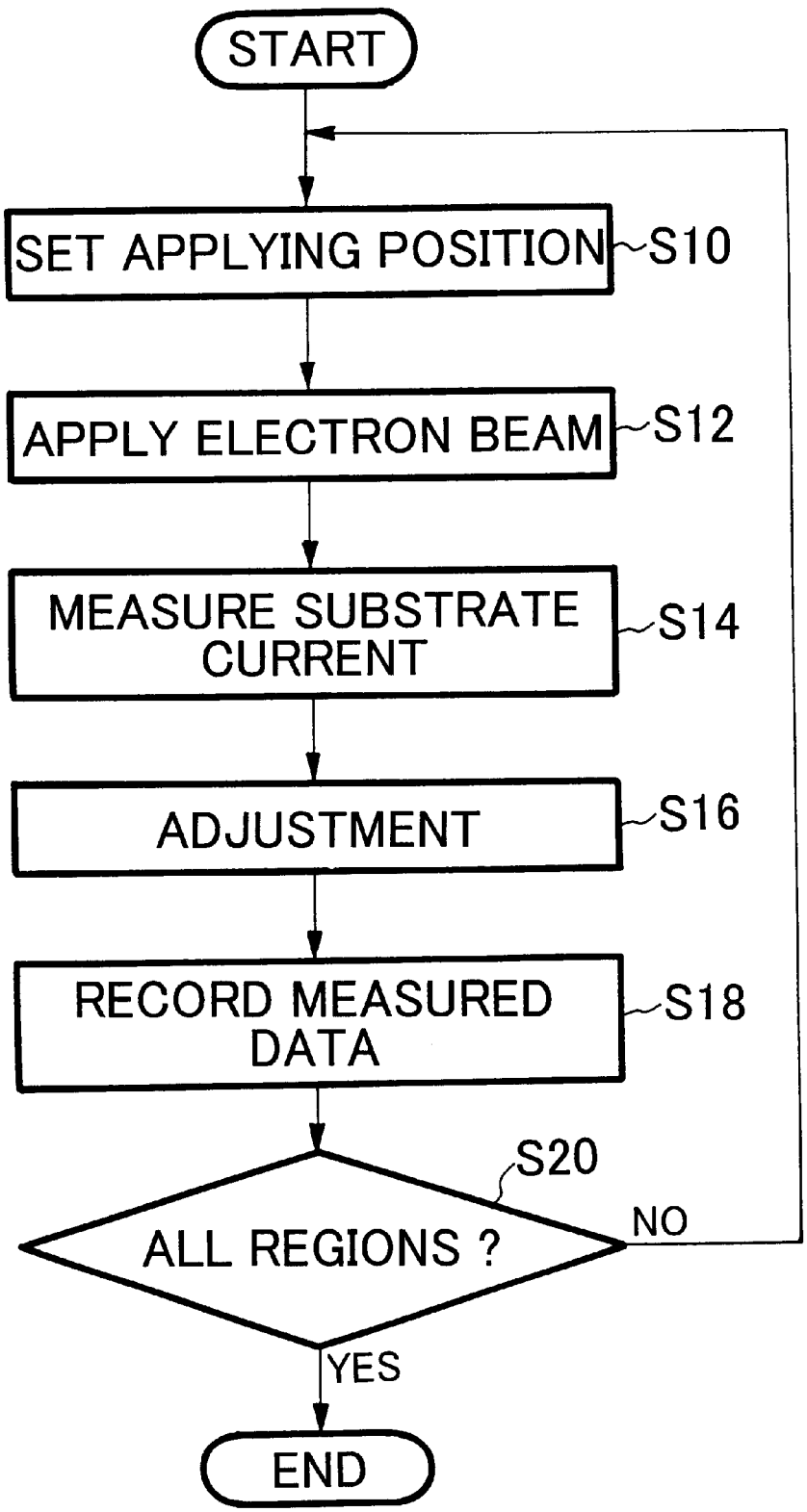
FIG. 4 is a flowchart showing a procedure of measuring a value of substrate current that flows in a substrate by applying an electron beam to a thin film on the substrate, according to a preferred embodiment of the present invention.

FIG. 4 is a flowchart showing a procedure of measuring a value of substrate current that flows in a substrate by applying an electron beam to a thin film on the substrate, according to a preferred embodiment of the present invention. First, an applying position of an electron beam on the thin film is set (step S10). Then, the electron beam is applied to the thin film in the set applying position (step S12). Subsequently, a value of substrate current that flows in the substrate when the electron beam is applied to the thin film is measured (step S14). Then, the measured substrate current value is adjusted through amplifiers (step S16), and the adjusted substrate current value is recorded correspondingly to the applying position as measured data (step S18). Thereafter, it is judged whether or not measurement in all the necessary regions has been finished (step S20). If not yet finished ("No" at step S20), the procedure returns to step S10 where a new applying position is set. On the other hand, if the measurement in all the necessary regions has been finished ("Yes" at step S20), the procedure is terminated.

Figure 5:
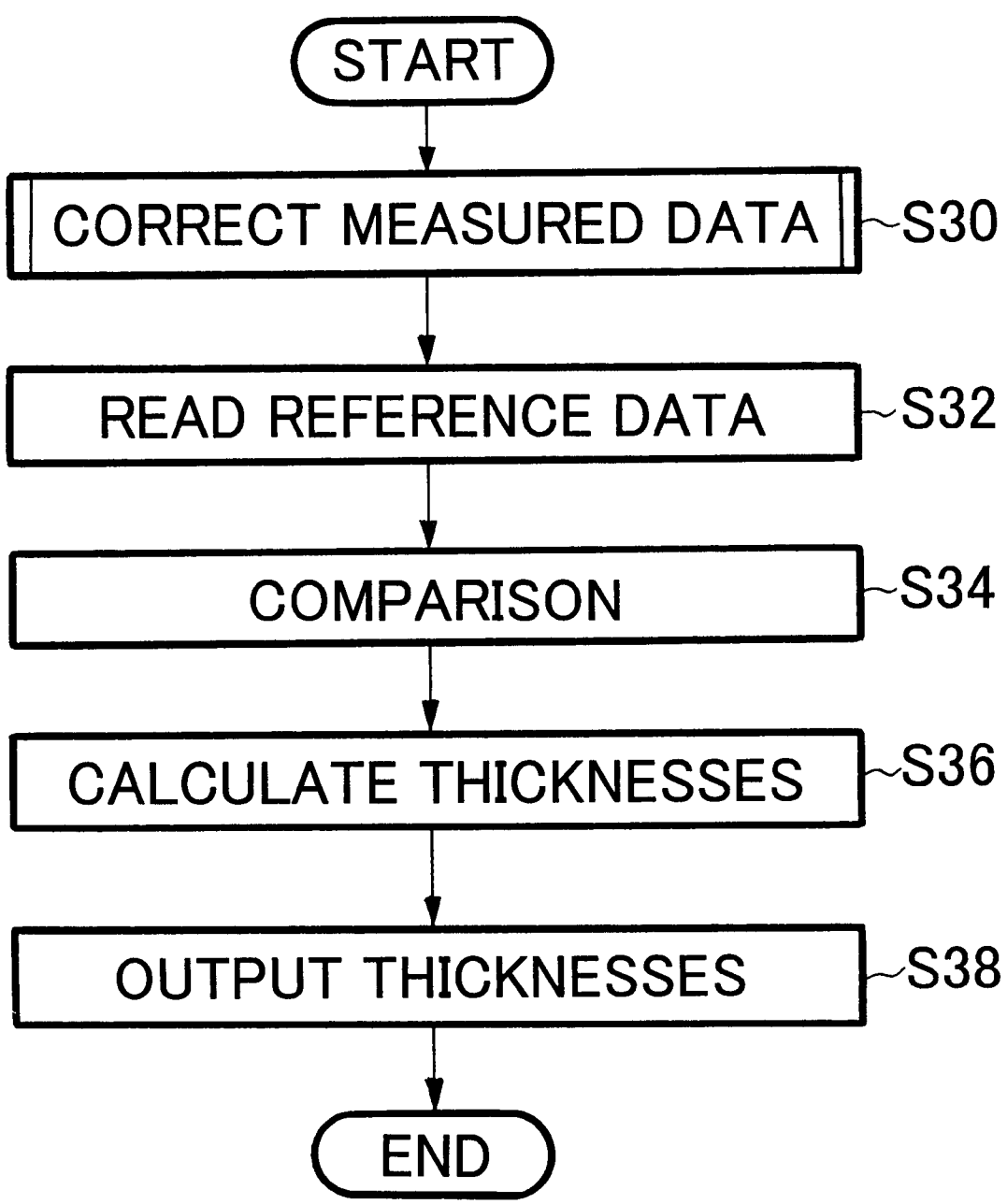
FIG. 5 is a flowchart showing a procedure of calculating a thickness of a thin film as a measurement object based on measured data and reference data.

FIG. 5 is a flowchart showing a procedure of calculating a thickness of the thin film as a measurement object based on the measured data and reference data. Here, the reference data represents a correlation between film thicknesses and substrate current values with respect to standard samples.

First, the measured substrate current values are corrected (step S30). Then, the reference data is read out (step S32), and the corrected substrate current values and the reference data are compared with each other (step S34) so that thicknesses corresponding to the corrected substrate current values are calculated (step S36). The calculated thicknesses are outputted correspondingly to the applying positions (step S38).

Figure 6:
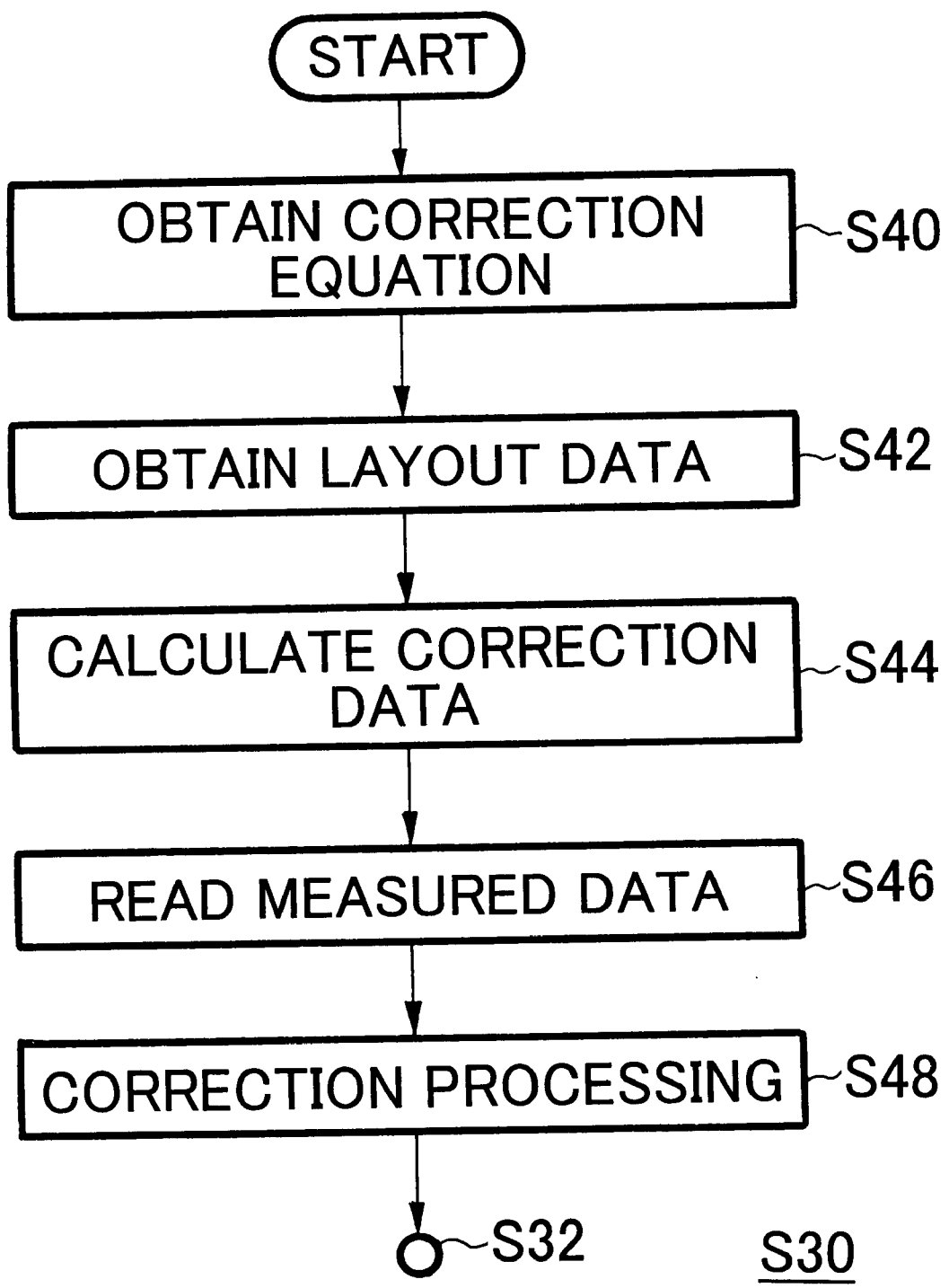
FIG. 6 is a flowchart representing details of measured data correction processing executed at step S30 in FIG. 5.

FIG. 6 is a flowchart representing details of the measured data correction processing executed at step S30 in FIG. 5. First, a correction equation is obtained that takes into account an influence of a charge distribution generated in the neighborhood of the thin film due to the application of the electron beam or an influence of a configuration of the surface of the substrate in the neighborhood of the thin film (step S40). Then, layout data of the sample in a region where the thin film is formed is obtained (step S42). Based on the obtained correction equation and layout data, correction data in the respective positions on the sample are calculated (step S44). Then, the measured data recorded at step S18 in FIG. 4 is read out (step S46), and correction processing therefor is executed based on the correction data (step S48).

Figure 7:
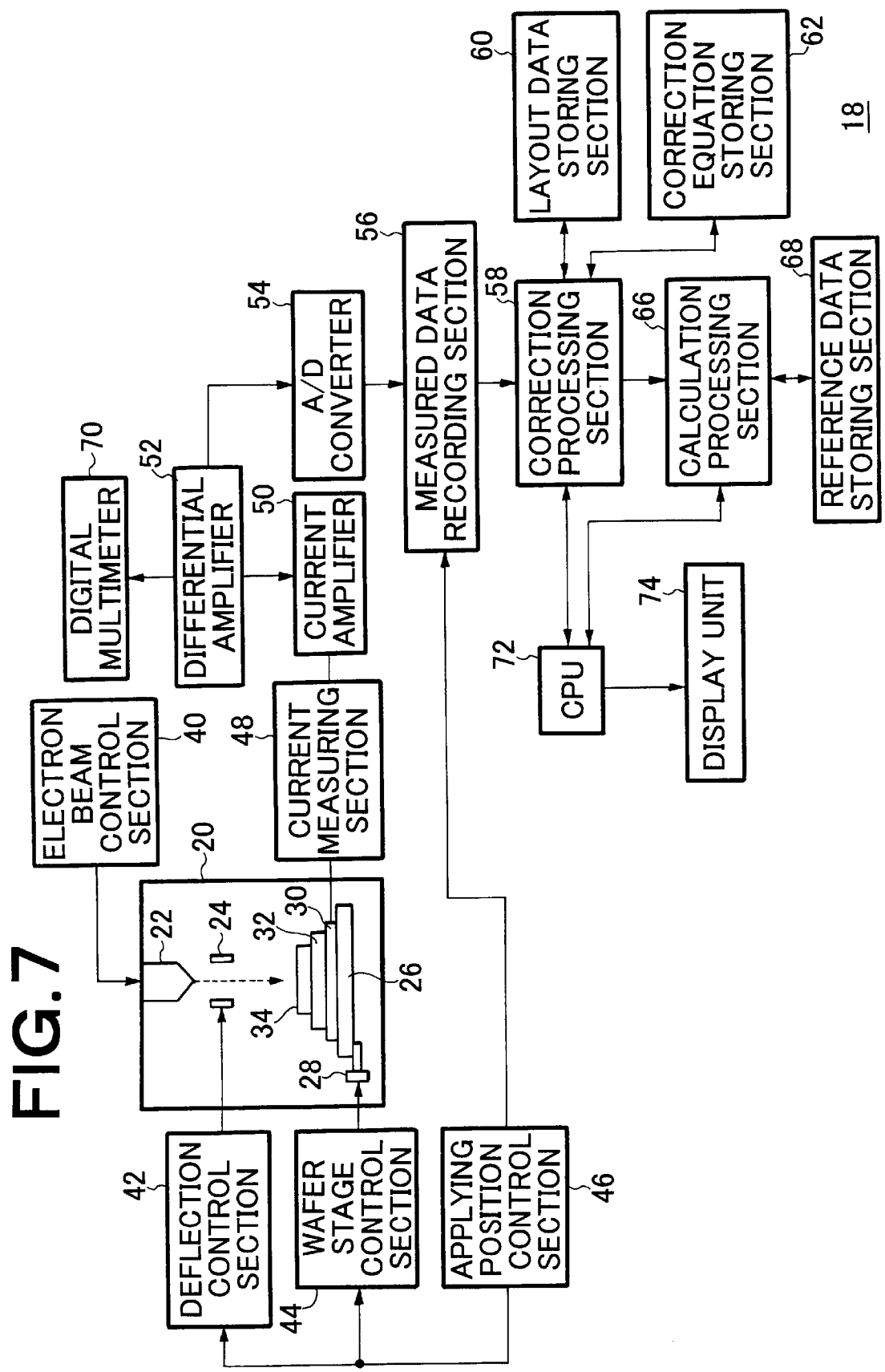
FIG. 7 is a block diagram showing a film thickness measuring apparatus according to the preferred embodiment of the present invention.

Now, a structure of a film thickness measuring apparatus for realizing the foregoing film thickness measuring method will be described. FIG. 7 is a block diagram showing the film thickness measuring apparatus according to the preferred embodiment of the present invention.

The film thickness measuring apparatus 18 comprises an electron beam processing section 20, an electron beam control section 40, a deflection control section 42, a wafer stage control section 44, an applying position control section 46, a current measuring section 48, a current amplifier 50, a differential amplifier 52, an A/D (Analog/Digital) converter 54, a measured data recording section 56, a correction processing section 58, a layout data storing section 60, a correction equation storing section 62, a calculation processing section 66, a reference data storing section 68, a digital multimeter 70, a CPU (Central Processing Unit) 72 and a display unit 74.

The electron beam processing section 20 comprises an electron gun 22 for producing an electron beam, a deflecting section 24 for deflecting an electron beam such that the electron beam is applied to a given region on a sample, a wafer stage 26 for retaining a sample, and a wafer stage driving section 28 for driving the wafer stage 26. In this embodiment, the electron beam processing section 20 includes an electrode 30 disposed on the wafer stage 26. A thin film 34 preformed on a substrate 32 as a sample subjected to measurement in this embodiment is placed on the electrode 30, while the electrode 30 detects a current that flows in the sample.

Although not shown in the figure, the electron beam processing section 20 has an acceleration voltage generating section, and the electron beam control section 40 controls the acceleration voltage generating section such that an electron beam with a predetermined acceleration voltage is radiated from the electron gun 22. Further, the electron beam processing section 20 may have means for applying a voltage to the neighborhood of the sample, such as the wafer stage 26. By applying the voltage to the neighborhood of the sample, the acceleration of the electron beam can be substantially lowered so that the measurement result can be obtained with high accuracy. Signals induced by the application of the voltage to the wafer stage 26 and so forth may be removed by means of the later-described differential amplifier 52. With this arrangement, the measurement result can be obtained with higher accuracy.

The deflection control section 42 controls the deflecting section 24. The wafer stage control section 44 controls the wafer stage driving section 28 to move the wafer stage 26 to a given position. The applying position control section 46 controls the deflection control section 42 and the wafer stage control section 44 such that an electron beam is applied to a given position on the sample. Although not shown in the figure, the film thickness measuring apparatus 18 may have electron gun moving means, and the applying position control section 46 may control the electron gun moving means to move the electron gun 22 such that an electron beam is applied to a given position on the sample.

The current measuring section 48 is connected to the electrode 30 and measures a value of substrate current detected by the electrode 30. The current amplifier 50 amplifies the measured substrate current value. The differential amplifier 52 has an offset adjusting function to remove an offset voltage caused by a leakage current of the film thickness measuring apparatus 18, and further amplifies the substrate current value. The differential amplifier 52 may perform the offset voltage correction using a difference between a current value when an electron beam is not applied and a current value when an electron beam is applied. The digital multimeter 70 displays the adjusted substrate current value.

The A/D converter 54 implements digital conversion of the substrate current value adjusted by the differential amplifier 52. The measured data recording section 56 records the digital-converted substrate current value. Further, the measured data recording section 56 acquires applying position data of the electron beam from the applying position control section 46. The measured data recording section 56 records the applying position data correspondingly to the measured substrate current value.

The layout data storing section 60 stores layout data of a region where the thin film 34 is formed. In this event, if, for example, an accumulation layer formed with a plurality of holes is formed on the substrate 32, the layout data storing section 60 stores data representing radii of the respective holes associated with positions thereof, as the layout data. The layout data may be measured values obtained by measuring a sample subjected to film thickness measurement, or design data of that sample. The layout data may be obtained through measurement using a CD-SEM (Critical Dimension Scanning Electron Microscope) apparatus or the film thickness measuring apparatus 18 itself as will be described later.

The correction equation storing section 62 stores a correction equation for correcting the measured data based on the layout data. The correction equation may be, for example, a function with a hole radius as a variable, a concrete example of which will be described later.

The correction processing section 58 reads out the measured data from the measured data storing section 56 and corrects the measured data taking into account an influence of a charge distribution generated in the neighborhood of the thin film 34 due to the application of the electron beam. In this event, the correction processing section 58 may correct the measured data taking into account an influence of a configuration of the surface of the substrate in the neighborhood of the thin film 34.

The reference data storing section 68 stores reference data representing a correlation between film thicknesses and substrate current values with respect to standard samples. In this event, the reference data may be acquired by associating measured values obtained upon applying an electron beam by the film thickness measuring apparatus 18 using standard samples including thin films having known film thicknesses, with the film thicknesses. The thin films included in the standard samples are preferably formed of the same material as a material of the thin film 34, but may be formed of another material inasmuch as it has the same secondary electron emission capability as that of the material of the thin film 34. The reference data is preferably acquired by using, for example, thin films formed on a flat substrate. The correction processing section 58 may correct the measured data taking into account a difference between a configuration of the surface of a substrate in the neighborhood of the thin film when the reference data was acquired, and a configuration of the surface of the substrate in the neighborhood of the thin film 34 upon acquiring the measured data.

Further, in another example, reference data may be derived through a theoretical calculation taking into account secondary electron emission capabilities of the thin film 34 subjected to measurement and the substrate 32. Further, if, for example, the thin film 34 is formed of SiON, reference data may be derived through a ratio calculation from substrate current values measured for $SiO_2$ and SiN, respectively.

The calculation processing section 66 calculates a thickness of the thin film 34 subjected to measurement from the measured substrate current value, taking into account the reference data stored in the reference data storing section 68. The CPU 72 controls the whole of the film thickness measuring apparatus 18. The display unit 74 displays the result of the calculation.

Figure 8:
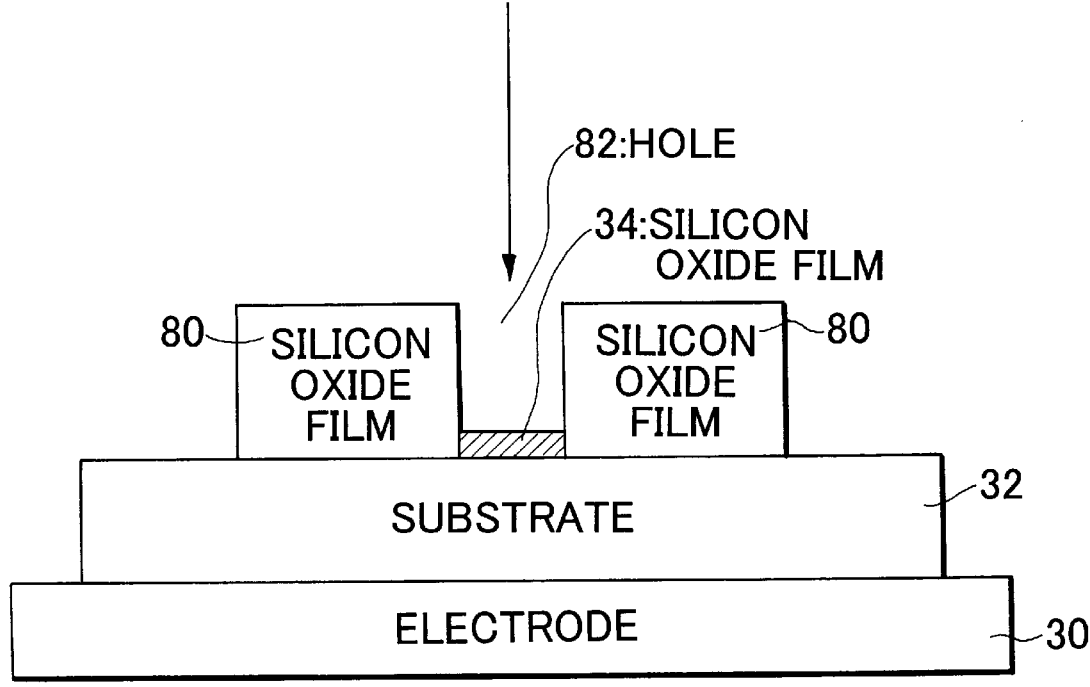
FIG. 8 is a sectional view showing an example of a sample as a measurement object of the film thickness measuring apparatus according to the preferred embodiment of the present invention.

FIG. 8 is a sectional view showing one example of a sample subjected to measurement of the film thickness measuring apparatus 18 in this embodiment. The film thickness measuring apparatus 18 measures a thickness of a thin film 34 formed at the bottom of each of holes 82 formed on an accumulation film 80 accumulated on the substrate 32. As a concrete example of the hole 82, there is, for example, a contact hole formed by etching. In this event, the thin film 34 subjected to measurement may be a residual film of a layer insulation film upon etching the layer insulation film on the substrate, or an etching stopper layer provided between the substrate and the layer insulation film. Here, the substrate 32 is preferably a conductor or semiconductor. In this embodiment, the substrate 32 is formed of silicon.

The thin film 34 may be formed of, for example, $SiO_2$ (including those containing P or B)(silicon oxide film), SiN (silicon nitride film), SiON (silicon oxide-nitride film), SiOF (silicon fluorine-contained oxide film), SiONF (silicon fluorine-contained oxide-nitride film), USG (undoped silicate glass), BPSG (borophosphosilicate glass), PSG (phosphosilicate glass), polymer such as organic giant molecules, inorganic oxide film, silicide, nitride film, ferroelectric substance, polyimide, resist, fluorocarbon, carbon, protein, DNA, or low dielectric constant material (low-k film) such as SOG (spin on glass), FOX (flowable oxide), Pariren, Cytop, BCB (bensocyclobutene). HSQ (hydrogen silsesquinxane), MSQ (methyl silsesquinxane) or Silk (registered trademark of Dow Chemical Company). The thin film 34 may also be formed of, for example, metal such as Al, W, Mo, Pt, Au, Cu, Ti or Co alloy. In this embodiment, the accumulation film 80 and the thin films 34 are formed of silicon oxide films.

Here, it has been explained that the thin film 34 is provided at the bottom of the hole. However, the thin film 34 may also be provided, for example, at the bottom of a concave portion such as a groove, or on the top surface of a convex portion, i.e. not limited to the hole. In this case, the concave portion may have any opening shape inasmuch as an electron beam can be applied to the thin film 34.

Figure 9:
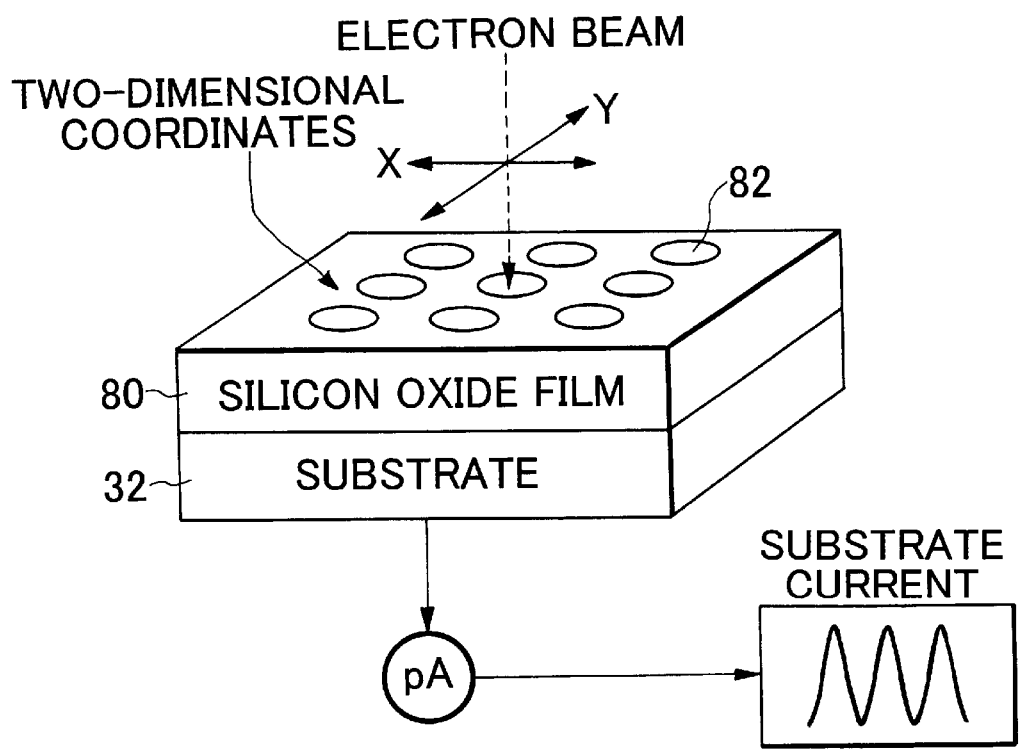
FIG. 9 is an exemplary diagram showing the state of scanning an electron beam on the sample.

FIG. 9 is an exemplary diagram showing the state of scanning an electron beam on the sample. The applying position control section 46 controls the wafer stage control section 44, the deflection control section 42 and so forth, thereby to scan the electron beam two-dimensionally in X- and Y-directions on the sample.

In this embodiment, the film thickness measuring apparatus 18 measures the thin film 34 provided at the bottom of each hole 82. Therefore, the electron beam is preferably held perpendicular so as to directly reach the thin film 34 at the bottom of the hole. When measuring the thickness of the thin film provided at the bottom of the hole 82 or at the bottom of a concave portion such as a groove as described above, it is desirable to scan the electron beam by moving the wafer stage 26 or the electron gun 22 so as to apply the electron beam perpendicularly to the surface of the sample, rather than deflecting the electron beam. Further, by applying the electron beam perpendicularly to the thin film 34 in the hole 82, the amount of secondary electrons that hit upon the silicon oxide accumulation film 80 to be absorbed before being applied to the thin film 34, can be reduced. Thus, the thickness of the thin film 34 can be calculated more accurately.

The electron beam is preferably applied to any portions of the sample in the measurement range at the same angle. With this arrangement, the secondary electron emission amount can be held quantitatively so that the film thickness can be calculated accurately from the measured substrate current value. The film thickness measuring apparatus 18 measures the substrate current values while scanning the electron beam on the sample as described above, and causes the measured data recording section 56 to record the measured substrate current values correspondingly to the applying positions of the electron beam.

Figures 10, 11:
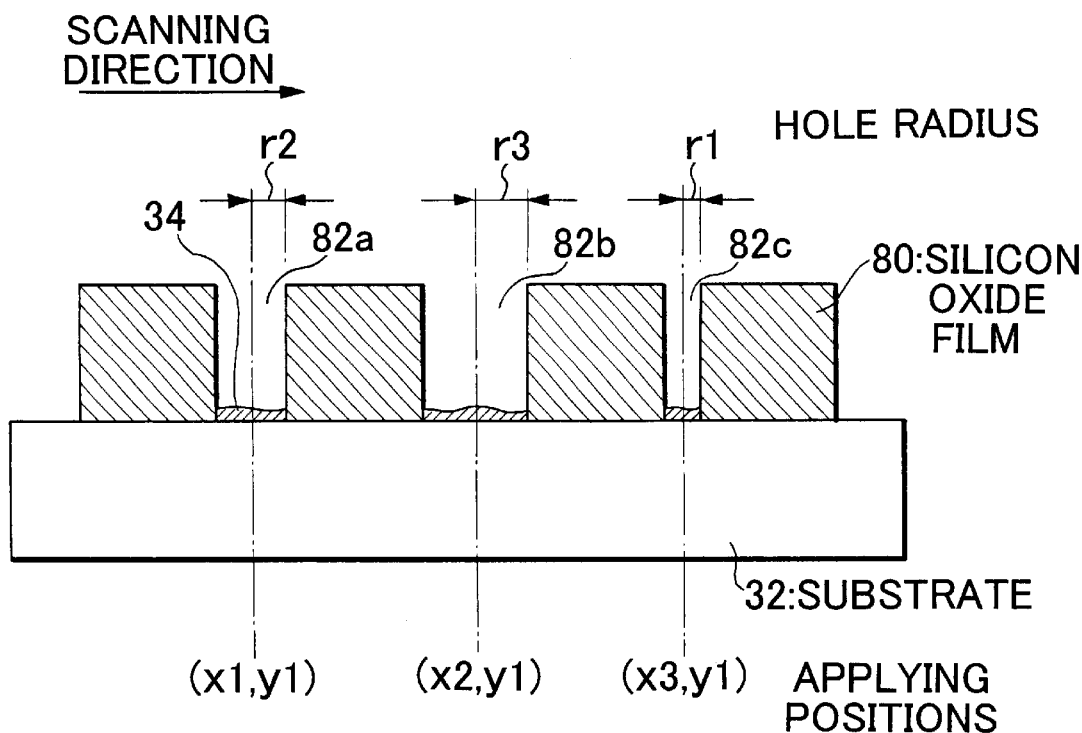
FIG. 10 is a sectional view showing another example of a sample as a measurement object of the film thickness measuring apparatus according to the preferred embodiment of the present invention.
FIG. 11 is a diagram showing a table that is used by a correction processing section.

FIG. 10 is a sectional view showing another example of a sample as a measurement object of the film thickness measuring apparatus 18 in this embodiment. The film thickness measuring apparatus 18 measures the sample in which a silicon oxide accumulation film 80 accumulated on the silicon substrate 32 is formed thereon with a plurality of holes 82a, 82b and 82c, and a thin film 34 is provided at the bottom of each hole. Radii r1, r2 and r3 of the holes 82a, 82b and 82c differ from each other. Applying positions of an electron beam on the sample are (x1, y1), (x2, y1), (x3, y1) at the centers of the holes 82a, 82b and 82c.

Referring now to FIGS. 7 to 10, an operation of the film thickness measuring apparatus 18 in this embodiment will be described.

In FIG. 7, a sample as a measurement object is placed on the electrode 30 disposed on the wafer stage 26. Here, the sample shown in FIG. 10 is used as the measurement object. The electron beam control section 40 controls the acceleration voltage generating section such that an electron beam with predetermined energy is radiated from the electron gun 22. First, the applying position control section 46 controls the wafer stage control section 44 and the deflection control section 42 such that the electron beam is applied to the given position (x1, y1) on the sample. The applying position control section 46 outputs this applying position (x1, y1) to the measured data recording section 56.

When the electron beam is applied to the sample from the electron gun 22, secondary electrons are emitted from the sample. Therefore, electrons flow out from the substrate 32 into the thin film 34 for compensating for the secondary electrons emitted from the thin film 34, and thus a compensation current flows in the substrate 32. Further, a current generated by the electron beam that is radiated from the electron gun 22 but does not hit upon the sample flows in the substrate 32. In the substrate 32, a substrate current that is the sum of those currents flows. The electrode 30 detects the substrate current, and the current measuring section 48 measures a value of the substrate current.

The measured substrate current value is adjusted through the current amplifier 50, the differential amplifier 52 and the A/D converter 54. Assuming that the digital-converted substrate current value is a, the measured data recording section 56 records the substrate current value a correspondingly to the applying position (x1, y1).

The applying position control section 46 controls the applying position of the electron beam on the sample, and measurement of a substrate current value is repeated in the same manner in the positions (x2, y1) and (x3, y1). The measured data recording section 56 records substrate current values b and c in the respective positions correspondingly to the applying positions (x2, y1) and (x3, y1), respectively.

FIG. 11 is a diagram showing a table used by the correction processing section 58. Referring to this figure, processing executed in the correction processing section 58 will be described hereinbelow. The correction processing section 58 reads out from the measured data recording section 56 the substrate current values a, b and c that are associated with the applying positions (x1, y1), (x2, y1) and (x3, y1), respectively.

The correction processing section 58 acquires from the correction equation storing section 62 a correction equation f(r) for correcting a substrate current value based on a hole radius r. Hereinbelow, one example of a calculation method for the correction equation will be described.

Assuming that a work function is $\Phi$, incident electron energy is $E_0$ and a potential from the exterior is V, secondary electron emission energy E is given as follows, wherein $\Phi$ is a value that changes depending on a thickness of the thin film 34.

$$E = E_0 - (\Phi + V) \qquad \text{[Equation 1]}$$

On the other hand, a potential V' generated by a certain electron at a point of a distance r is given as follows, wherein A and B are positive constants.

$$V' = A \times \exp(-B \times r) \qquad \text{[Equation 2]}$$

Assuming that the potential V from the exterior is given by V' of Equation 2, a hole radius is r, and n electrons are accumulated on the wall of the hole 82 in the state where the electrons are saturated, Equation 1 can be changed as follows.

$$E = E_0 - \Phi - n \times A \times \exp(-B \times r) \qquad \text{[Equation 3]}$$

Since energy detected on the underside of the substrate corresponds to a difference between the incident electron energy $E_0$ and the secondary electron emission energy E, Equation 3 can be changed as follows.

$$E_0 - E = \Phi + n \times A \times \exp(-B \times r) \quad \text{[Equation 4]}$$

Accordingly, a detected substrate current I is given as follows, wherein a is a constant, and b and c are positive constants.

$$I = a + n \times b \times \exp(-c \times r) \quad \text{[Equation 5]}$$

In this case, if a thickness of the accumulation film 80 is a prescribed value, the number n of electrons adhered to the wall is considered to be proportional to a hole radius r, so that Equation 5 can be changed as follows, wherein $\alpha$ is a constant determined depending on a thickness of the thin film 34, and $\beta$ and $\gamma$ are positive constants.

$$I = \alpha + \beta \times r \times \exp(-\gamma \times r) \quad \text{[Equation 6]}$$

Therefore, assuming that an output that is expected when there is no effect relying on a hole radius is I', the output I' is given as follows, wherein the effect relying on the hole radius is subtracted from the measured value I.

$$I' = I - \beta \times r \times \exp(-\gamma \times r) \quad \text{[Equation 7]}$$

Then, values of $\alpha$, $\beta$ and $\gamma$ of Equation 6 are calculated. First, using a sample that was overetched upon forming a plurality of holes by etching on an accumulation film on a silicon substrate, substrate current values are measured. It is assumed that only natural oxide films adhered to the silicon substrate are provided at the bottoms of the holes in the overetched sample, and thus thicknesses of residual films are constant irrespective of hole radii.

Figures 12A, 12B:
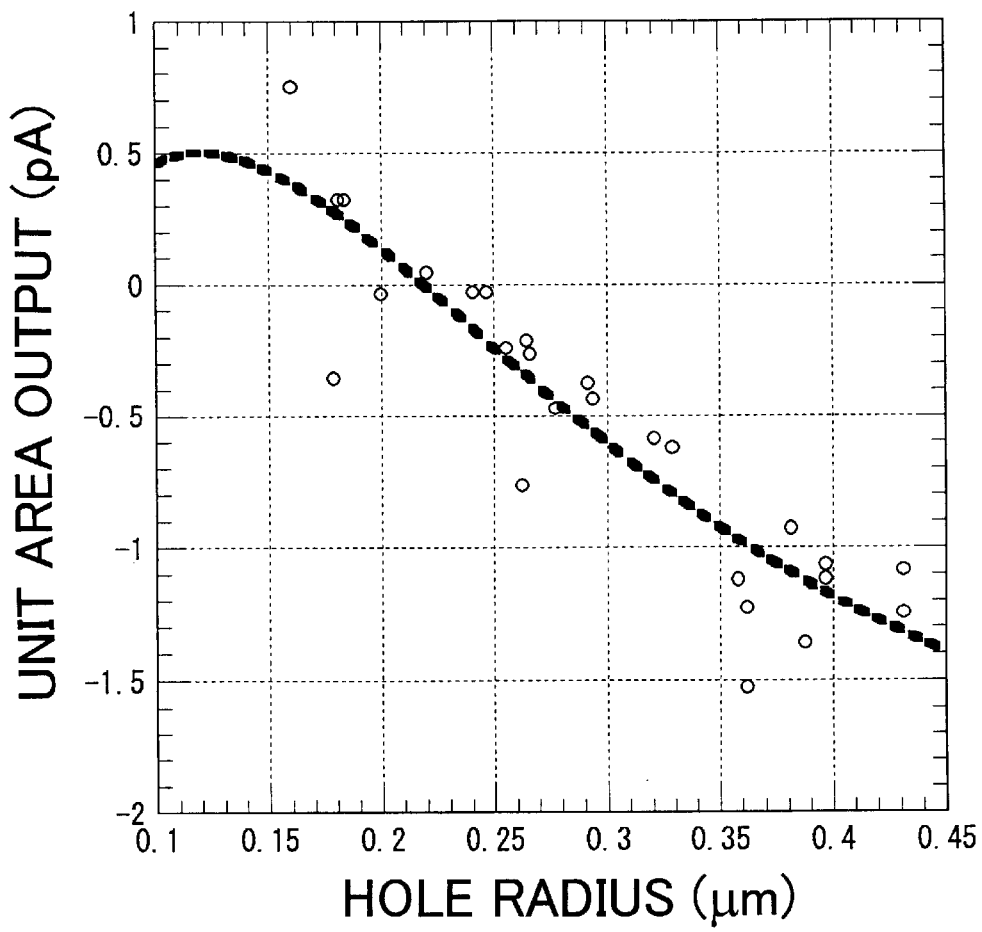
FIGS. 12A and 12B are a graph showing a correlation between substrate current values and hole radii for calculating a correction equation.

FIGS. 12A and 12B are a graph showing a correlation between obtained substrate current values and hole radii derived by a CD-SEM apparatus. The hole radius falls within the range of 0.15 μm to 0.45 μm. Using the graph of FIG. 12A, $\alpha$, $\beta$ and $\gamma$ were calculated that make the least a difference between a measured substrate current value and a theoretical value derived by Equation 6, with respect to the overetched sample. As a result, as shown in FIG. 12B, $\beta = 56.428$ and $\gamma = 8.3947$ were obtained.

The obtained values of $\beta$ and $\gamma$ were put into Equation 7 to correct the measured substrate current values. Also with respect to underetched and just-etched samples, substrate current values were measured and corrected in the same manner. Here, just-etching represents etching for the mean time between overetching and underetching.

Figure 13:
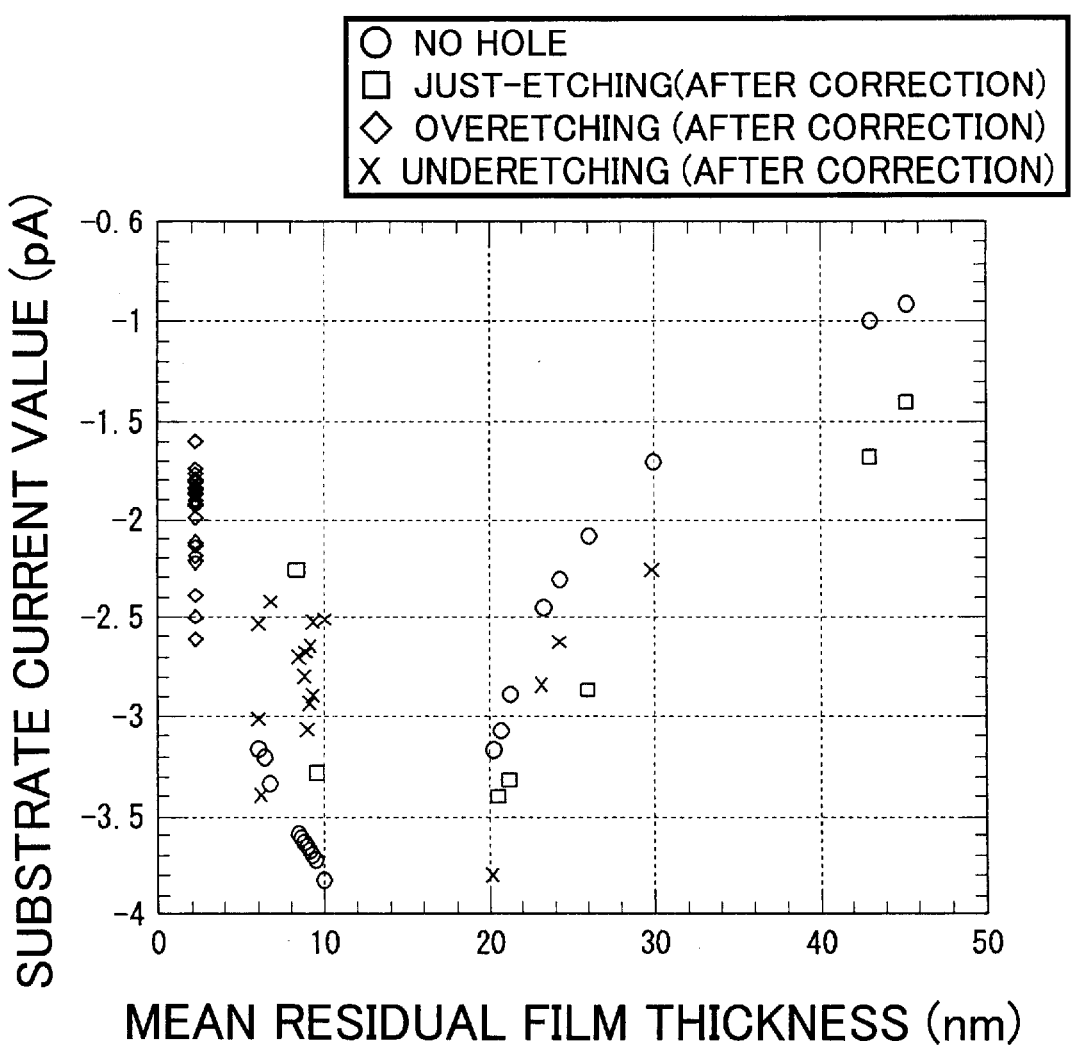
FIG. 13 is a graph showing the result of calculating thicknesses of respective thin films by comparing corrected measured data and reference data.

By comparing the corrected measured data with the reference data, the thickness of each thin film was calculated. The calculation result is shown in FIG. 13. For reference, a correlation between substrate current values and thicknesses obtained upon applying an electron beam to thin films, respectively, each formed on a flat silicon substrate with no hole, is also shown.

Explanation has been made of the case where the hole radius r is used, while, Equation 7 may also be given as follows, wherein d represents a thickness of the accumulation film and x' represents an aspect ratio.

$$I' = I - \beta \times d/x' \times \exp(-\gamma \times d/x') \quad \text{[Equation 8]}$$

The correction equation storing section 60 stores the thus derived correction equation $f(r) = 56.428 \times r \times \exp(-8.3947 \times r)$. In the correction equation f(r), values of $\beta$ and $\gamma$ in Equation 7 are derived per material. The correction equation may be inputted from the exterior, or the film thickness measuring apparatus 18 may have a correction equation calculating function. The correction equation used herein is only an example, and various correction equations may be suggested depending on a configuration of a concave-convex portion.

Referring back to FIG. 11, the correction processing section 58 acquires from the layout data storing section 60 layout data representing the arrangement of the holes 82 on the accumulation film 80. The correction processing section 58 detects a hole radius r and a position of each hole 82 from the layout data. The correction processing section 58 associates the hole radii r of the holes formed in positions corresponding to the applying positions, with the respective applying positions. Here, the hole radii in the electron beam applying positions (x1, y1), (x2, y1) and (x3, y1) are r2, r3 and r1, respectively. Then, the correction processing section 58 calculates correction data by putting each hole radius into the correction equation f(r). The correction processing section corrects each substrate current value by subtracting the correction data from the substrate current value. For example, the corrected substrate current value in the electron beam applying position (x1, y1) is a'=a−f(r2), the corrected substrate current value in the electron beam applying position (x2, y1) is b'=b−f(r3), and the corrected substrate current value in the electron beam applying position (x3, y1) is c'=c−f(r1).

The calculation processing section 66 reads out the reference data from the reference data storing section 68, and compares it with the corrected measured data to calculate the thickness of the thin film 34 in each applying position.

A series of the foregoing operations is performed by the CPU 72 and a control program for operating it, and the calculation result is displayed on the display unit 74. The measured data recording section 56 may record the calculated film thicknesses correspondingly to the applying position data.

Figure 14:
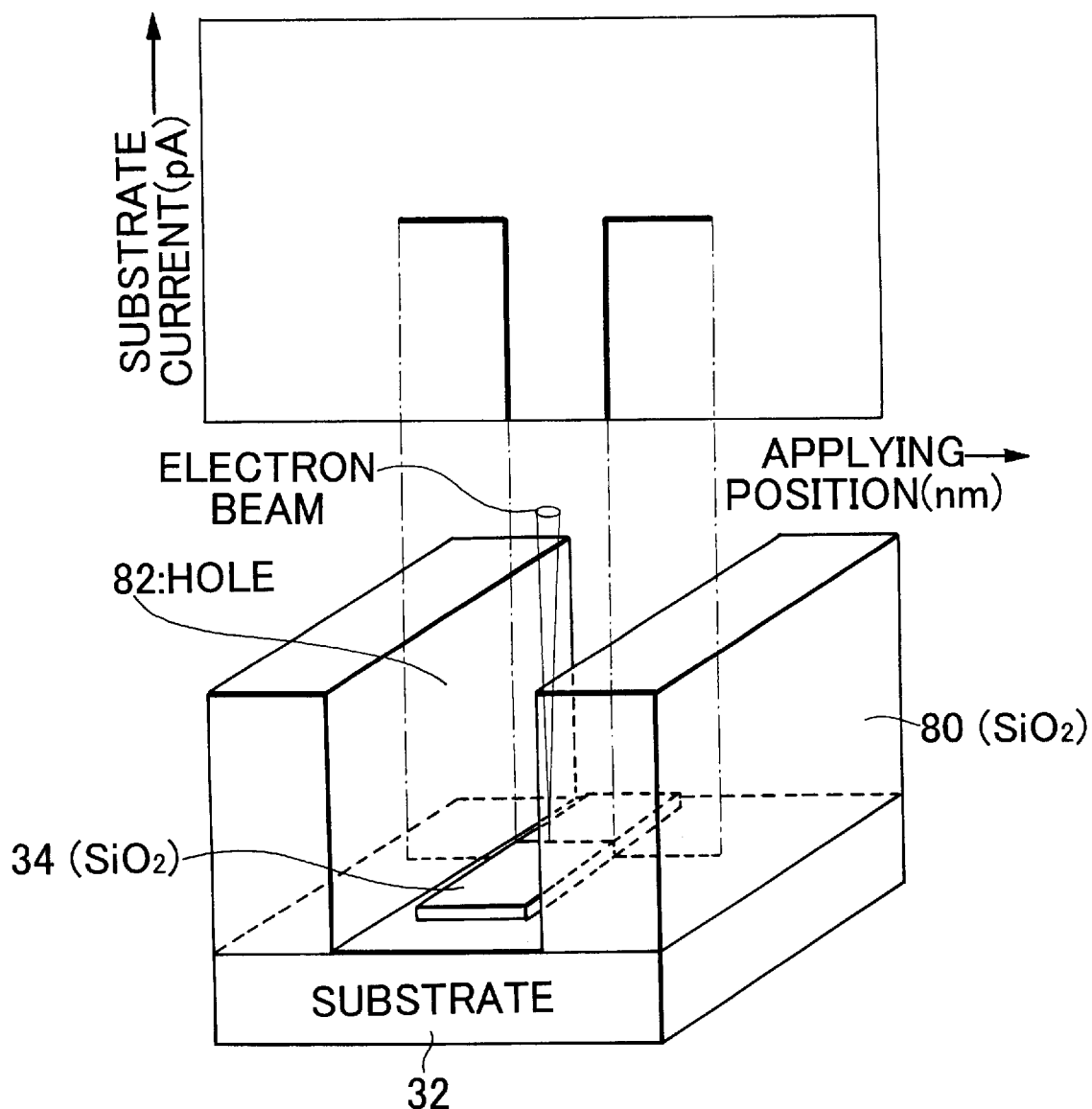
FIG. 14 is a graph showing a correlation between applying positions and substrate current values.

FIG. 14 is a graph showing a correlation between applying positions and substrate current values. This figure shows a correlation between applying positions and substrate current values when scanning an electron beam in a direction crossing a silicon oxide thin film 34 as a measurement object, wherein the thin film 34 is provided at the bottom of a hole 82 formed on a silicon oxide accumulation film 80 accumulated on the silicon substrate 32.

By acquiring the substrate current values correspondingly to the applying positions as noted above, a configuration of the hole 82 can also be detected. The film thickness measuring apparatus 18 may use the thus obtained data as layout data. For example, the film thickness measuring apparatus 18 may quickly obtain layout data by increasing the scanning speed of an electron beam when aiming to acquire the layout data, and then implement electron beam applying processing for the purpose of measuring substrate current values based on the obtained layout data.

The present invention has been described in terms of the preferred embodiment thereof. It is understood by an expert in the art that the preferred embodiment is only an example, that various modifications are possible in combination of the respective constituent elements and the respective processes, and that those modifications also fall within the scope of the present invention.

According to the film thickness measuring apparatus or method of the present invention, the thickness of even a thin film formed at the bottom of a hole with a high aspect ratio or on a substrate having a concave-convex surface can be measured accurately.

What is claimed is:

1. A method of measuring a thickness of a thin film as a measurement object formed on a substrate using a value of substrate current that flows in the substrate upon applying an electron beam to the thin film, the method comprising the steps of:

acquiring reference data representing a correlation between film thicknesses and substrate current values with respect to standard samples;

acquiring the value of substrate current that flows in the substrate upon applying the electron beam to the thin film formed on the substrate;

correcting the substrate current value taking into account an influence of a charge distribution generated in the neighborhood of the thin film due to the application of the electron beam; and calculating the thickness of the thin film based on the corrected substrate current value taking into account the reference data.

2. A method of measuring a thickness of a thin film as a measurement object formed on a substrate using a value of substrate current that flows in the substrate upon applying an electron beam to the thin film, the method comprising the steps of:

acquiring reference data representing a correlation between film thicknesses and substrate current values with respect to standard samples;

acquiring the value of substrate current that flows in the substrate upon applying an electron beam to the thin film formed on the substrate;

correcting the substrate current value taking into account an influence of a configuration of the surface of the substrate in the neighborhood of the thin film; and calculating the thickness of the thin film based on the corrected substrate current value taking into account the reference data.

3. The method according to claim 1, wherein the thin film is provided at the bottom of a concave portion formed on the surface of the substrate and, the step of correcting the substrate current value calculates the influence of the charge distribution depending on a configuration of the concave portion where the thin film is provided.

4. The method according to claim 3, further comprising a step of detecting configurations of a plurality of concave potions formed on the surface of the substrate correspondingly to the positions of the concave portions, respectively, wherein the step of acquiring the substrate current value acquires substrate current values correspondingly to positions of the concave portions, respectively, and the step of correcting the substrate current value corrects the substrate current values depending on the configurations of the concave portions, respectively.

5. The method according to claim 3, wherein each of the concave portions is a hole, and the correcting step corrects the substrate current value using a correction equation having a radius of the hole as a variable of the correction equation.

6. The method according to claim 3, further comprising a step of acquiring layout data representing the arrangement of the concave portions formed on the surface of the substrate, wherein the step of acquiring the substrate current value acquires positions on the thin films where the electron beam is applied, correspondingly to the substrate current values, and the step of correcting the substrate current value corrects the substrate current values based on the layout data of the positions where the electron beam is applied.

7. The method according to claim 6, wherein the step of acquiring the layout data comprises the steps of:

applying an electron beam to the thin films for acquiring the layout data, before applying the electron beam to the thin films for calculating the thicknesses of the thin films;

acquiring a value of substrate current that flows in the substrate thereupon, correspondingly to each of applying positions of the electron beam; and detecting the arrangement of the concave portions formed on the surface of the substrate based on the substrate current values and the applying positions.

8. The method according to claim 6, wherein the step of acquiring the layout data acquires the layout data based on design data of the sample.

9. An apparatus for measuring a thickness of a thin film as a measurement object using a value of substrate current that flows in a substrate upon applying an electron beam to the thin film formed on the substrate, the apparatus comprising:

a reference data acquiring section for acquiring reference data representing a correlation between film thicknesses and substrate current values with respect to standard samples;

a measured data acquiring section for acquiring a value of substrate current that flows in the substrate upon applying an electron beam to the thin film as the measurement object formed on the substrate;

a correction processing section for correcting the substrate current value taking into account an influence of a charge distribution generated in the neighborhood of the thin film due to the application of the electron beam; and a calculation processing section for calculating the thickness of the thin film as the measurement object based on the corrected substrate current value taking into account the reference data.

10. The apparatus according to claim 9, wherein the thin film is provided at the bottom of a concave portion formed on the surface of the substrate, and the correction processing section calculates the influence of the charge distribution depending on a configuration of the concave portion where the thin film is provided.

11. An apparatus for measuring a thickness of a thin film as a measurement object using a value of substrate current that flows in a substrate upon applying an electron beam to the thin film formed on the substrate, the apparatus comprising:

a reference data acquiring section for acquiring reference data representing a correlation between film thicknesses and substrate current values with respect to standard samples;

a measured data acquiring section for acquiring the value of substrate current that flows in the substrate upon applying an electron beam to the thin film as the measurement object formed on the substrate;

a correction processing section for correcting the substrate current value taking into account an influence of a configuration of the surface of the substrate in the neighborhood of the thin film; and a calculation processing section for calculating the thickness of the thin film as the measurement object based on the corrected substrate current value taking into account the reference data.

12. The apparatus according to claim 9, further comprising:
- an electron beam applying section for applying the electron beam to the thin film as the measurement object; and
- a current measuring section for measuring a value of substrate current that flows in the substrate upon applying the electron beam to the thin film,
- wherein the measured data acquiring section acquires the substrate current value from the current measuring section.

13. The apparatus according to claim 12, wherein the current measuring section comprises an electrode provided in contact with the substrate, and measures a current flowing in the electrode as the substrate current value.

14. The apparatus according to claim 12, further comprising a layout data storing section for storing layout data representing the arrangement of the concave portion formed on the surface of the substrate, wherein
- the current measuring section acquires a position on the thin film where the electron beam is applied, correspondingly to the substrate current value, and
- the correction processing section corrects the substrate current value based on the layout data of the position where the electron beam is applied.

15. The apparatus according to claim 9, wherein the concave portion is a hole, and the correction processing section corrects the substrate current value using a correction equation having a radius of the hole as a variable.

16. The apparatus according to claim 14, wherein a plurality of concave portions are formed on the surface of the substrate,
- the measured data recording section stores substrate current values correspondingly to positions of the concave portions, respectively,
- the layout data storing section stores configurations of the concave potions correspondingly to the positions of the concave portions, respectively, and
- the correction processing section corrects the substrate current values depending on the configurations of the concave portions, respectively.

17. A program for causing a computer to execute a method of measuring a thickness of a thin film as a measurement object using a value of substrate current that flows in a substrate upon applying an electron beam to the thin film formed on the substrate, the method comprising the steps of:
- acquiring reference data representing a correlation between film thicknesses and substrate current values with respect to standard samples;
- acquiring the value of substrate current that flows in the substrate upon applying an electron beam to the thin film as the measurement object formed on the substrate;
- correcting the substrate current value taking into account an influence of a charge distribution generated in the neighborhood of the thin film due to the application of the electron beam; and
- calculating the thickness of the thin film as the measurement object based on the corrected substrate current value taking into account the reference data.

18. A program for causing a computer to execute a method of measuring a thickness of a thin film as a measurement object using a value of substrate current that flows in a substrate upon applying an electron beam to the thin film formed on the substrate, the method comprising the steps of:
- acquiring reference data representing a correlation between film thicknesses and substrate current values with respect to standard samples;
- acquiring the value of substrate current that flows in the substrate upon applying an electron beam to the thin film as the measurement object formed on the substrate;
- correcting the substrate current value taking into account an influence of a configuration of the surface of the substrate in the neighborhood of the thin film; and
- calculating the thickness of the thin film as the measurement object based on the corrected substrate current value taking into account the reference data.

* * * * *